United States Patent [19]

Nakamura

[11] 4,414,947
[45] Nov. 15, 1983

[54] FUEL INJECTION SYSTEM FOR MULTI-CYLINDER INTERNAL COMBUSTION ENGINES, HAVING HIGH INJECTION PRESSURE

[75] Inventor: Hisashi Nakamura, Matsuyama, Japan

[73] Assignee: Diesel Kiki Co., Ltd., Tokyo, Japan

[21] Appl. No.: 397,165

[22] Filed: Jul. 12, 1982

[30] Foreign Application Priority Data

Jul. 17, 1981 [JP] Japan .................................. 56-111737

[51] Int. Cl.$^3$ ............................................. F02M 39/00
[52] U.S. Cl. ....................................................... 123/446
[58] Field of Search ........................ 123/446, 456, 467

[56] References Cited

U.S. PATENT DOCUMENTS 2,670,033  2/1954  Ray ...................................... 123/446
3,011,489  12/1961  Bessiere ............................. 123/446

FOREIGN PATENT DOCUMENTS 1262089  2/1972  United Kingdom ................ 123/446

*Primary Examiner*—Ira S. Lazarus
*Assistant Examiner*—Magdalen Moy
*Attorney, Agent, or Firm*—Frishauf, Holtz, Goodman & Woodward

[57] ABSTRACT

Residual pressure control means corresponding in number to the cylinders of the engine are connected between the delivery valves of the fuel injection pump and the respective injection pipes. The residual pressure control means are interconnected in an arrangement corresponding to the sequence of fuel injection through the delivery valves. Each of the control means is adapted to transfer the injecting fuel pressure present therein on its injection nozzle side to its next control means when the same injecting fuel pressure exceeds the injection fuel pressure present therein on its injection pump side at the termination of each fuel injection, to obtain increased injection pressure of fuel injected by an injection nozzle associated with the above next control means during the immediately following fuel injection.

2 Claims, 3 Drawing Figures

FUEL INJECTION SYSTEM FOR MULTI-CYLINDER INTERNAL COMBUSTION ENGINES, HAVING HIGH INJECTION PRESSURE

BACKGROUND OF THE INVENTION

This invention relates to a fuel injection system for multi-cylinder internal combustion engines, and more particularly to a fuel injection system of this kind which is adapted to utilize the residual fuel pressure present in the injection pipes at the termination of each fuel injection for the immediately following fuel injection.

In fuel injection systems for diesel engines or the like, injecting fuel should be atomized to the finest possible particle size in order to achieve complete combustion of a required quantity of fuel in an engine cylinder in the shortest possible time. To this end, in recent years more and more attempts have been made to enhance the injection pressure of fuel injection systems of this kind. Particularly fuel injection systems for direct-injection engines are required to achieve very high injection pressure of 600 $Kg/cm^2$ for instance. On the other hand, in conventional fuel injection systems, in order to obtain sharp cut-off of fuel injection at the end of each fuel injection the fuel pressure in the injection pipe is reduced to a value almost equal to atmospheric pressure due to the retraction stroke of the delivery valve, and at the next fuel injection the same fuel pressure is raised up to a required value from the value almost equal to atmospheric pressure. In a conventional fuel injection pump, a camshaft, which is rotated in unison with the rotation of the engine to reciprocate the plungers of the pump, has its cam profile designed so as to obtain a rise in the fuel pressure in the injection pipe from atmospheric pressure or like pressure to required injection pressure during each fuel injection. However, it is difficult to increase the effective stroke length of the plungers beyond a certain value by changing the cam profile, making it difficult to obtain higher injection pressure.

OBJECTS AND SUMMARY OF THE INVENTION

It is an object of the invention to provide a fuel injection system for multi-cylinder internal combustion engines, which is provided with residual pressure control means for positively obtaining high injection pressure.

It is a further object of the invention to provide a fuel injection system for multi-cylinder internal combustion engines, which is provided with residual pressure control means for obtaining high injection pressure, while obtaining sharp cut-off of fuel injection as well.

It is another object of the invention to provide a fuel injection system for multi-cylinder internal combustion engines, which is provided with residual pressure control means which can be easily mounted onto a conventional fuel injection pump and simple in construction.

According to the present invention, residual pressure control means corresponding in number to the cylinders of the engine are connected between the delivery valves of the fuel injection pump and the respective injection pipes. The above residual pressure control means are interconnected in an arrangement corresponding to the sequence of fuel injection through the delivery valves, for allowing transfer of injecting fuel pressure present in each one of the control means to a next one of the control means. Each of the control means includes a first valve responsive to a differential pressure between injecting fuel pressure present therein on the pump side of the control means and injecting fuel pressure present therein on the nozzle side thereof, to interrupt transfer of the injecting fuel pressure on the nozzle side to the next control means when the injecting fuel pressure on the pump side is higher than that on the nozzle side during fuel delivery stroke of the fuel injection pump, and to allow transfer of the injecting fuel pressure on the nozzle side to the next control means when the injecting fuel pressure on the nozzle side exceeds that on the pump side at the termination of the above fuel delivery stroke of the pump; and a second valve disposed to prevent backflow of the injecting fuel pressure transferred to the next control means. During the fuel delivery stroke of the pump immediately following the above first-mentioned fuel delivery stroke, the injecting fuel pressure fed to the next control means is supplied to a corresponding fuel injection nozzle, together with fuel pressure newly delivered by the pump.

The above and other objects, features and advantages of the invention will be more apparent from the ensuing detailed description taken in connection with the accompanying drawings.

DETAILED DESCRIPTION

The present invention will now be described with reference to the drawings showing an embodiment thereof.

Figure 1:
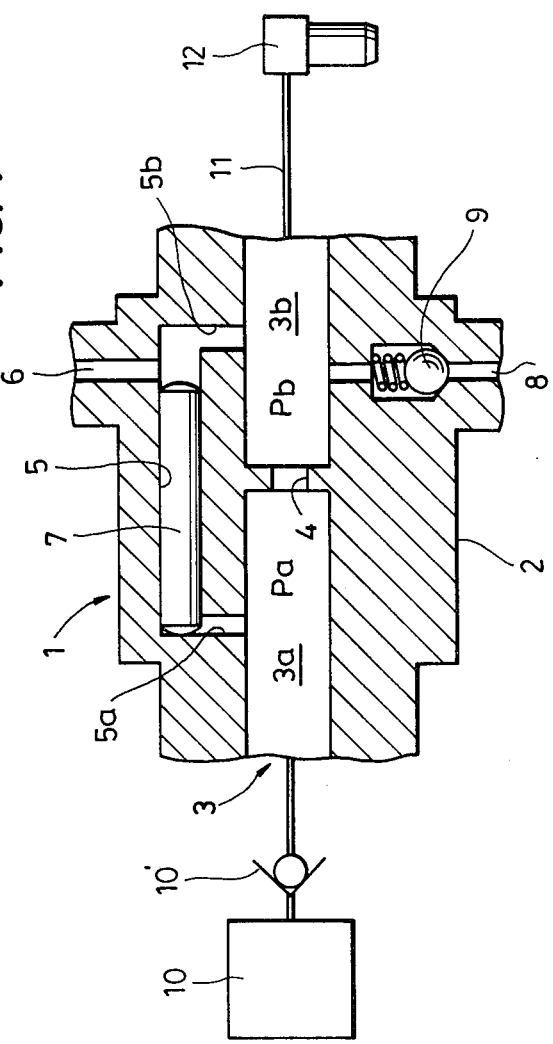
FIG. 1 is a schematic longitudinal sectional view of a fuel injection system according to an embodiment of the invention, showing in detail a residual pressure control means.

Referring first to FIG. 1, an injection system according to the invention is schematically illustrated, with a residual pressure control unit 1 shown in detail on an enlarged scale, which forms the essential part of the fuel injection system. The unit 1 has a main body 2 which is formed therein with a through bore 3 extending substantially along its axis, which bore has a narrowed central portion 4 acting as an orifice. The through bore 3 is divided in two portions defined on opposite sides of the orifice 4 and communicating with each other through the orifice 4, that is, a first portion 3a connected to a fuel injection pump 10 and a second portion 3b connected, by means of an injection pipe 11, to an injection nozzle 12 for injecting fuel into a corresponding cylinder of an engine, not shown. The main body 2 of the unit 1 is further formed therein with a lateral bore 5 arranged in parallel with the through bore 3, which has its opposite ends communicating, respectively, with the first portion 3a and second portion 3b of the bore 3 through respective communication passages 5a and 5b extending at right angles to the intermediate main portion of the bore 5. An outlet port 6 is formed in the main body 2, which opens in an inner wall portion of the lateral bore 5 in the vicinity of one end of the bore 5 and communicates with the second portion $3b$ of the through bore 3 via the communication bore $5b$. A piston 7, which acts as a valve for closing the outlet port 6 is slidably received within the lateral bore 5 for displacement in the bore 5 in response to differential pressure between the first portion $3a$ of the through bore 3 and the second portion $3b$ of same, which acts upon the piston 7 through the communication bores $5a$ and $5b$, to establish or interrupt the communication between the outlet port 6 and the second portion $3b$ of the through bore 3 on the side toward the injection nozzle 12. Further formed in the main body 2 of the unit 1 is an outlet port 8 opening in the inner wall of the second portion $3b$ of the through bore 3, in which is provided a check valve 9 which is disposed to open when fuel pressure flowing into the port 8 is larger than the fuel pressure in the second portion $3b$ of the through bore 3.

Figure 2:
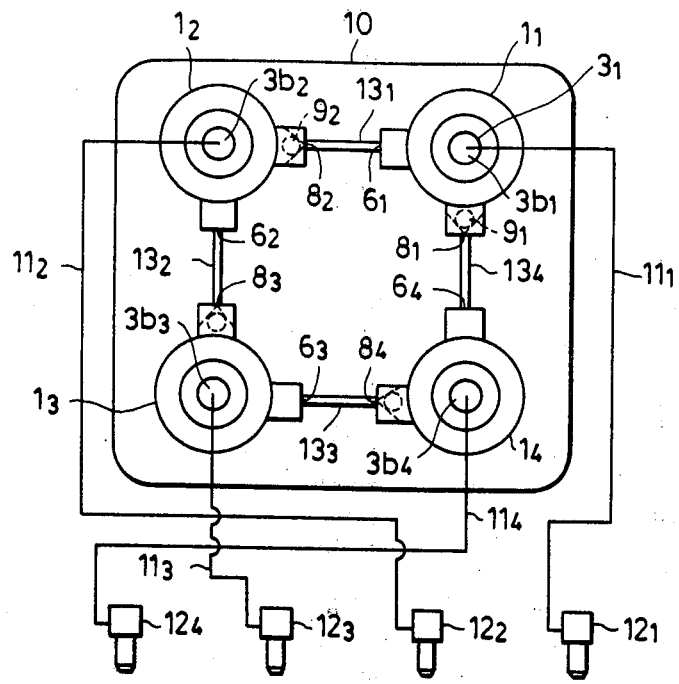
FIG. 2 is an end view of residual pressure control means mounted on a distributor type fuel injection pump for four-cylinder engines.

A plurality of the residual pressure control units 1 constructed as above, which correspond in number to the cylinders of the engine, are mounted on the fuel injection pump 10. FIG. 2 shows the manner of mounting four residual pressure control units $1_1$, $1_2$, $1_3$ and $1_4$ on a distributor type fuel injection pump 10 for four-cylinder engines. The four units $1_{1-4}$ are mounted on the respective four delivery valves $10'$ (one of which is shown in FIG. 1) of the pump 10, with the first portions $3a$ of the through bores 3 directly coupled to the outlets of the delivery valves by a suitable means such as screw-threaded engagement. On the other hand, the units $1_{1-4}$ are connected to their respective injection nozzles $12_1$, $12_2$, $12_3$ and $12_4$ by means of injection pipes $11_1$, $11_2$, $11_3$ and $11_4$, at the second portions $3b_1$, $3b_2$, $3b_3$ and $3b_4$ of the through bores 3. Assuming that the sequence of fuel injection through the delivery valves $10'$ of the fuel injection pump 10 and the sequence of ignition in the cylinders of the engine correspond to the numerical order of the numerals suffixed to the units 1 in FIG. 2, the outlet port $6_1$ of the unit $1_1$ is connected to the inlet port $8_2$ of the unit $1_2$, the outlet port $6_2$ of the unit $1_2$ to the inlet port $8_3$ of the unit $1_3$, the outlet port $6_3$ of the unit $1_3$ to the inlet port $8_4$ of the unit $1_4$, and the outlet port $6_4$ of the unit $1_4$ to the inlet port $8_1$ of the unit $1_1$, respectively. The above interconnection of the four units $1_{1-4}$ is made by means of connecting pipes $13_1$, $13_2$, $13_3$ and $13_4$. Incidentally, in the case of the arrangement in FIG. 2, the outlet port 6 and inlet port 8 of each unit 1 are directed at right angles to each other.

The operation of the arrangement described above will now be explained. When the fuel injection pump 10 operates through its fuel delivery stroke to first feed fuel under pressure into the through bore $3_1$ of the residual pressure control unit $1_1$, the fuel pressure Pa in the first portion $3a$ of the through bore 3 on the side toward the fuel injection pump 10 becomes higher than the fuel pressure Pb in the second portion $3b$ on the side toward the injection nozzle 12 due to the action of the orifice 4 of the through bore 3. The piston 7 is slidably displaced in the lateral bore 5 in response to the differential pressure between the pressure Pa and the pressure Pb to block the outlet port $6_1$, to interrupt the communication between the outlet port $6_1$ and the second portion $3b_1$ of the through bore $3_1$ on the injection nozzle side. Since on this occasion the inlet port $8_1$ communicating with the second portion $3b_1$ of the through bore $3_1$ is kept closed by the check valve $9_1$, the pressurized fuel in the through bore $3_1$ is then delivered through the injection pipe $11_1$ to the injection nozzle $12_1$ to be injected into a corresponding cylinder of the engine. Then, when the cut-off port of the plunger, not shown, of the fuel injection pump 10 is opened, the corresponding delivery valve $10'$ is retracted and closed. Due to the retracting stroke of the delivery valve $10'$, the fuel pressure in the first portion $3a_1$ of the through bore $3_1$ drops to a value almost equal to atmospheric pressure. On the other hand, at the termination of the above injection residual pressure is present in the injection pipe $11_1$, which causes the fuel pressure Pb in the second portion $3b_1$ of the through bore $3_1$ on the injection nozzle side to be higher than the fuel pressure Pa in the first portion $3a_1$ on the pump side. Consequently, the piston 7 is responsive to the differential pressure between the pressure Pa and the pressure Pb to be now displaced toward the fuel injection pump 10 to open the outlet port $6_1$, establishing the communication between the outlet port $6_1$ and the second portion $3b_1$ of the through bore $3_1$. Then, the residual pressure present in the injection pipe $11_1$ and the second portion $3b_1$ of the through bore $3_1$ escapes through the communication port $5b$, the outlet port $6_1$ and the connecting pipe $13_1$ into the inlet port $8_2$ of the next unit $1_2$ to urgingly open the check valve $9_2$ in the inlet port $8_2$ and is then fed through same into the through bore $3b_2$ of the unit $1_2$ and its related injection pipe $11_2$. The residual pressure thus fed into the unit $1_2$ stays in the same unit without flowing back to the unit $1_1$ by the action of the check valve $9_2$. Since the residual pressure in the unit $1_1$ is transferred into the unit $1_2$ as stated above, the residual pressure in the injection pipe $11_1$ connected to the first unit $1_1$ drops to a fairly low level to cause complete cut-off of fuel injection through the injection nozzle $12_1$ into the corresponding engine cylinder.

At the fuel delivery stroke immediately following the above fuel delivery stroke, the fuel injection pump 9 then delivers pressurized fuel to the unit $1_2$. Since the injection pipe $11_2$ connected to the unit $1_2$ has been supplied with the residual fuel pressure from the preceding unit $1_1$ as stated above, the fuel pressure in the injection pipe $11_2$ then promptly reaches a required high value so that fuel injection takes place through the injection nozzle $12_2$ under sufficiently high injection pressure. The residual fuel pressure in the unit $1_2$ is also fed into the next adjacent unit $1_3$ in the same manner as stated above, and after this similar operations to the above are successively carried out in the following units $1_3$ and $1_4$.

Figure 3:
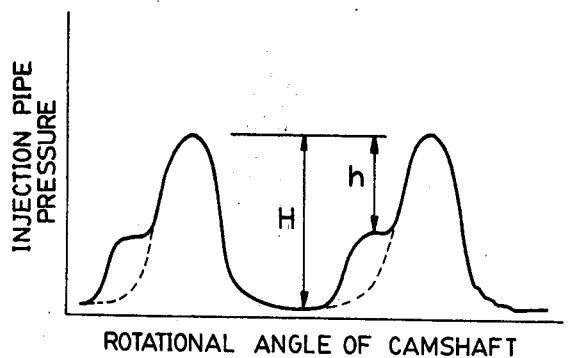
FIG. 3 is a graph showing the relationships between the rotational angle of the pump camshaft and the fuel pressure in an injection pipe on the injection nozzle side, obtained by a conventional fuel injection pump and a fuel injection pump provided with residual pressure control means according to the present invention.

FIG. 3 graphically shows the relationships between the rotational angle of the pump camshaft and the fuel pressure in the injection pipe, in which the curve indicated by the dotted line represents a fuel pressure characteristic obtained by a conventional fuel injection pump, and the curve indicated by the solid line that obtained by a fuel injection system provided with the residual pressure control means according to the present invention. As shown in the graph, the conventional fuel injection pump has to elevate the pressure in the injection pipe by a relatively large amount H to obtain required injection pressure, whereas in the fuel injection system provided with the residual pressure control means of the present invention, the pressure in the injection pipe has only to be elevated by a relatively small amount h to obtain the required injection pressure. Furthermore, it is noted from the graph that according to the fuel injection system of the present invention, at the termination of fuel injection, the pressure in the injection pipe drops to a low level almost the same as that obtained by the conventional fuel injection pump, thus not degradating the fuel injection cut-off characteristic. Incidentally, in the fuel injection system of the present invention, the residual fuel pressure, which is supplied into each residual pressure control unit, is set at such a value that the residual fuel pressure alone cannot virtually cause fuel injection.

Although in the illustrated embodiment the residual pressure control means according to the invention is applied to a distributor type fuel injection pump, the same means may be applied to in-line type fuel injection pumps, as well.

While a preferred embodiment has been described, variations thereto will occur to those skilled in the art within the scope of the present inventive concepts which are delineated by the following claims.

What is claimed is:

1. A fuel injection system for an internal combustion engine having a plurality of cylinders, comprising: a fuel injection pump having delivery valves corresponding in number to the cylinders of the engine; injection nozzles disposed to inject fuel into the cylinders of the engine; injection pipes connected to said injection nozzles; a plurality of control means corresponding in number to the cylinders of the engine and each connected between each of said delivery valves and a corresponding one of said injection pipes, said control means being interconnected in an arrangement corresponding to a predetermined sequence of fuel injection through said delivery valves for allowing transfer of injecting fuel pressure present in each one of said control means to a next one thereof, said control means each including a first valve responsive to differential pressure between injecting fuel pressure present therein on a side of said control means toward said fuel injection pump and fuel pressure present therein on another side of said control means toward a corresponding one of said injection nozzles, to interrupt transfer of the injecting fuel pressure on said corresponding injection nozzle side to a next one of said control means when the injecting fuel pressure on said fuel injection pump side is higher than the injecting fuel pressure on said corresponding injection nozzle side during each fuel delivery stroke of said fuel injection pump, and to allow transfer of the injecting fuel pressure on said corresponding injection nozzle side to said next control means when the fuel pressure on said corresponding injection nozzle side exceeds the injecting fuel pressure on said fuel injection pump side at the termination of the fuel delivery stroke of said fuel injection pump, and a second valve disposed to prevent backflow of the injecting fuel pressure transferred to said next control means, whereby during a fuel delivery stroke of said fuel injection pump immediately following said first-mentioned fuel delivery stroke, the injecting fuel pressure transferred to said next control means is supplied to another one of said injection nozzles corresponding to said next control means, together with injecting fuel pressure newly delivered by said fuel injection pump.

2. The fuel injection system as claimed in claim 1, wherein said control means each comprise a main body which is formed therein with a through bore having an intermediate portion thereof formed as an orifice, a first portion connected to said fuel injection pump and a second portion connected to a corresponding one of said injection nozzles, said first and second portions being defined on opposite sides of said orifice and communicating with each other through said orifice, a lateral bore communicating at one end thereof with said first portion of said through bore and at another end thereof with said second portion of said through bore, an outlet port opening in said lateral bore at a location in the vicinity of said another end thereof, and an inlet port communicating with said second portion of said through bore; a piston element slidably received within said lateral bore and responsive to differential pressure between injecting fuel pressure present in said first portion of said through bore and injecting fuel pressure present in said second portion of said through bore to be displaced in said lateral bore to open and close said outlet port; and a check valve arranged in said inlet port for preventing backflow of injecting fuel pressure in said second portion of said through bore; said outlet port being connected to an inlet port formed in a next one of said control means.

* * * * *